US012592379B2

(12) United States Patent
Kovacs et al.

(10) Patent No.: US 12,592,379 B2
(45) Date of Patent: Mar. 31, 2026

(54) ANODE MATERIAL AND ANODE FOR A RECHARGEABLE BATTERY, A METHOD OF PRODUCTION THEREOF AND AN ELECTROCHEMICAL CELL MADE THEREFROM

(71) Applicant: BroadBit Batteries Oy, Espoo (FI)

(72) Inventors: Andras Kovacs, Espoo (FI); David Brown, Helsinki (FI)

(73) Assignee: BroadBit Batteries Oy, Espoo (FI)

( * ) Notice: Subject to any disclaimer, the term of this patent is extended or adjusted under 35 U.S.C. 154(b) by 636 days.

(21) Appl. No.: 17/288,417

(22) PCT Filed: Oct. 24, 2019

(86) PCT No.: PCT/FI2019/050759
§ 371 (c)(1),
(2) Date: Apr. 23, 2021

(87) PCT Pub. No.: WO2020/084197
PCT Pub. Date: Apr. 30, 2020

(65) Prior Publication Data
US 2022/0006075 A1      Jan. 6, 2022

(30) Foreign Application Priority Data

Oct. 24, 2018    (FI) ..................................... 20185896

(51) Int. Cl.
*H01M 4/36*          (2006.01)
*H01M 4/02*          (2006.01)
(Continued)

(52) U.S. Cl.
CPC ........... *H01M 4/362* (2013.01); *H01M 4/134* (2013.01); *H01M 4/1395* (2013.01);
(Continued)

(58) Field of Classification Search
CPC .................................................. H01M 10/054
See application file for complete search history.

(56) References Cited

U.S. PATENT DOCUMENTS

| 4,335,191 A | 6/1982 | Peled |
|---|---|---|
| 4,968,568 A | 11/1990 | Higley |

(Continued)

FOREIGN PATENT DOCUMENTS

| CN | 108649265 A | 10/2018 |
|---|---|---|
| EP | 0 421 159 A1 | 4/1991 |

(Continued)

OTHER PUBLICATIONS

International Search Report for International Patent Application No. PCT/FI2019/050759 dated Dec. 19, 2019, 5 pages.
(Continued)

*Primary Examiner* — Stephan J Essex
(74) *Attorney, Agent, or Firm* — Merchant & Gould P.C.

(57) ABSTRACT

An anode material for an electrochemical cell comprises a matrix material:distributed material composite, which comprises one or more alkali metals and/or alkali earth metals. The distributed material may comprise a metal other than that of the matrix material, such as a transition and/or post transition metal. The anode material may be all or part of an anode for an electrochemical cell, which may further comprises a current collector and/or an SEI layer. The electrolyte may comprises an alkali metal and/or alkali earth metal and/or a transition metal and/or post transition metal containing electrolyte salt. The matrix material and/or the distributed material may comprise one or more of the metals of the electrolyte salt. All or part of the anode may be used as a substrate for electro-deposition of one or more matrix materials during charging and/or all or part of the anode may be used as a source of matrix material during discharging. The electrolyte may further comprise one or more electro-
(Continued)

lyte additives. The anode material may be produced by mixing a matrix material and distributed material and heating the mixture to selectively melt the matrix material to produce a matrix material:distributed material composite. The composite may be further chemically or mechanically processed to reduce the size of the distributed material and/or to increase the homogeneity of the matrix material: distributed material composite. The anode material, the anode or the electrochemical cell may be used in a device.

17 Claims, 9 Drawing Sheets

(51) Int. Cl.

| | |
|---|---|
| *H01M 4/134* | (2010.01) |
| *H01M 4/1395* | (2010.01) |
| *H01M 4/38* | (2006.01) |
| *H01M 10/054* | (2010.01) |
| *H01M 10/0563* | (2010.01) |

(52) U.S. Cl.

CPC ......... *H01M 4/381* (2013.01); *H01M 10/054* (2013.01); *H01M 10/0563* (2013.01); *H01M 2004/027* (2013.01); *H01M 2300/002* (2013.01)

(56) References Cited

U.S. PATENT DOCUMENTS

| | | | |
|---|---|---|---|
| 5,278,005 | A | 1/1994 | Yamauchi et al. |
| 6,093,503 | A | 7/2000 | Isoyama et al. |
| 2006/0057463 | A1 | 3/2006 | Gao et al. |
| 2014/0363717 | A1 | 12/2014 | Bhavaraju et al. |
| 2015/0099194 | A1 | 4/2015 | Kim et al. |
| 2015/0099195 | A1 | 4/2015 | Kim et al. |
| 2017/0047626 | A1 | 2/2017 | Englert |
| 2018/0090786 | A1* | 3/2018 | Jeong ................ H01M 10/0567 |

FOREIGN PATENT DOCUMENTS

| | | |
|---|---|---|
| EP | 2 860 799 A1 | 4/2015 |
| EP | 2 999 037 A1 | 3/2016 |
| EP | 3 301 744 A1 | 4/2018 |
| GB | 2 536 435 A | 9/2016 |
| JP | S61245474 A | 10/1986 |
| JP | H046759 A | 1/1992 |
| JP | H07-307152 A | 11/1995 |
| KR | 2015-0041304 A | 4/2015 |
| KR | 2016-0016922 A | 2/2016 |
| WO | WO 2017/073075 A1 | 5/2017 |
| WO | WO 2017/149204 A2 | 9/2017 |

OTHER PUBLICATIONS

Written Opinion of the International Searching Authority for International Patent Application No. PCT/FI2019/050759 dated Dec. 19, 2019, 8 pages.

Written Opinion of the International Preliminary Examining Authority for International Patent Application No. PCT/FI2019/050759 dated Sep. 25, 2020, 7 pages.

Finnish Search Report for Finnish Patent Application No. 20185896 dated Jun. 6, 2019, 2 pages.

Finnish Office Action for Finnish Patent Application No. 20185896 dated Nov. 6, 2020, 7 pages.

Office Action dated Sep. 25, 2024 for corresponding Japanese patent application 10-2021-7015608 (10 pages including machine translation).

Korean Office Action dated Sep. 25, 2024 for corresponding Korean patent application 10-2021-7015608 (10 pages including machine translation).

English Translation of Japanese Office Action dated May 7, 2024 for corresponding Japanese Application No. 2021-522536 (6 pages).

Machine Translation of a Korean Office Action which issued on Aug. 25, 2024 for corresponding Korean Application No. 10-2021-7015608 (18 pages).

* cited by examiner

A

◇ Na:Al composite      ▢ plain Na

B

◇ Na:Al composite      ○ plain Na

◇ Na:Al composite      ○ plain Na

◇ Na:Al composite      ▢ plain Na

◇ Na:Al composite      ▢ plain Na

A

⬥ CF3SO2Cl additive      ▢ no additive

B

⬥ CF3SO2Cl additive      ▢ no additive

◇ CF3SO2Cl additive          ▢ no additive

◇ CF3SO2Cl additive          ▢ no additive

ANODE MATERIAL AND ANODE FOR A RECHARGEABLE BATTERY, A METHOD OF PRODUCTION THEREOF AND AN ELECTROCHEMICAL CELL MADE THEREFROM

This application is a National Stage Application of PCT/FI2019/050759, filed 24 Oct. 2019, which claims benefit of Ser. No. 20/185,896, filed 24 Oct. 2018 in Finland, and which applications are incorporated herein by reference. To the extent appropriate, a claim of priority is made to each of the above disclosed applications.

FIELD OF THE INVENTION

The present invention relates to rechargeable electrochemical battery cells. In particular, the invention concerns the preparation of metal matrix based electrodes, allowing battery chemistry improvements for electrochemical cells in terms of cost, lifetime and energy density.

BACKGROUND

High performance, long life and low cost batteries are advantageous for many applications, e.g. energy storage for electric vehicles or electric grids.

Intensive research is being conducted in the field of battery technology to develop a battery working with electro-deposited metallic anodes. Together with lithium, sodium-based metal anodes provide some of the highest theoretical gravimetric capacities of any anode material. For instance, the gravimetric capacity of sodium is over 1100 mAh/g, along with a potential of –2.7 V vs. SHE for the Na+/Na couple. Furthermore, metallic anodes do not require solid-state diffusion of ions to transfer material from the charged to the discharged state, but merely the successful deposition/dissolution of the ions to/from the surface of the metal. The resulting metallic anode is volumetrically compact, and does not require the electrolyte-filled inter-particle (intercalation) space of current battery anodes.

The above technical reasons, together with the high abundance and low cost of sodium, make sodium metal anode based batteries, in particular, highly desirable. However, the high ambient reactivity of alkali earth and, even more so, alkali metals, including metallic sodium and lithium, during battery cell assembly have, to date, prevented the use of, particularly, alkali metal, and, more particularly, metallic sodium anodes.

An alternative approach is the discharged state assembly of battery cells, using an air-stable current collector as the substrate for the electro-deposition of ions. Although some publications claim to have identified suitable methods for achieving sodium deposition and cycling with very close to 100% Coulombic efficiency, known studies still have major shortcomings, such as impractically expensive electrolyte composition, impractically complicated substrate preparation, irreproducibility of the published experimental procedure for the substrate preparation, or irreproducibility of the claimed Coulombic efficiency data. This is the reason for the absence of corresponding discharged state assembled metallic anode based battery manufacturing to date. A cost-efficiently manufacturable anodic substrate for efficient electro-deposition and stripping of metals, and in particular, metallic lithium and sodium, is therefore highly needed. The disclosed anode material, anode and anode production method allows electrochemical cell assembly to be carried out in a dry room or even open air environment. Successful development of such an anode is beneficial to commerce and industry.

SUMMARY OF THE INVENTION

An anode material for an electrochemical cell is disclosed. The anode material may comprise a matrix material distributed material composite. The anode material may comprise only a matrix material: distributed material composite. The matrix material may comprise one or more alkali metals. The matrix material may comprise one or more alkali earth metals. The matrix material may comprise one or more metallic alkali metals. The matrix material may comprise one or more metallic alkali earth metals. The matrix material may comprise one or more essentially pure alkali metals. The matrix material may comprise one or more essentially pure alkali earth metals. The matrix material may comprise an alloy. The distributed material may comprise a metal. The distributed material may comprise a metallic metal. The distributed material may comprise an essentially pure metal. The distributed material may comprise an alloy of essentially pure metals. The distributed material metal may be different from the matrix material. The matrix metal or metals and/or the distributed metal or metals may be metallic. The metal of the matrix material and/or the metal of the distributed material may an essentially pure metal or an alloy of essentially pure metals. The distributed material may comprise one or more transition metals. The distributed material may comprise one or more post transition metals. The distributed material may comprise one or more metallic transition metals. The distributed material may comprise one or more metallic post transition metals. The distributed material may comprise one or more essentially pure transition metals. The distributed material may comprise one or more essentially pure post transition metals. The distributed material may comprise an alloy of transition metals and/or essentially pure post transition metals. The distributed material may comprise an alloy of metallic transition metals and/or metallic post transition metals. The distributed material may comprise essentially pure transition metals and/or essentially pure post transition metals. The anode material material may comprise a single alkali metal and/or alkali earth metal and a single transition metal and/or post transition metal. The anode material material may comprise a single metallic alkali metal and/or metallic alkali earth metal and a single metallic transition metal and/or metallic post transition metal. The anode material material may comprise a single essentially pure alkali metal and/or essentially pure alkali earth metal and a single essentially pure transition metal and/or essentially pure post transition metal. The alkali metal may comprise lithium, potassium and/or sodium including any mixture or combination thereof. The one or more post transition metals may comprise aluminum, gallium, indium, tin and/or lead including any mixture or combination thereof. The matrix material may have a lower melting point than the distributed material. The matrix material may have a higher vapor pressure than the distributed material. The matrix material may be lithium or sodium. The matrix material may be metallic lithium or sodium. The matrix material may be essentially pure lithium or sodium. The distributed material may be aluminum. The distributed material may be metallic aluminum. The distributed material may be essentially pure aluminum.

An anode for an electrochemical cell is disclosed. The anode may comprise the disclosed anode material. The anode may further comprises a current collector and/or an SEI layer. The current collector may comprise one or more conductive materials.

An electrochemical cell is disclosed. The electrochemical cell of the invention may be a rechargeable electrochemical cell. The electrochemical cell may comprise the disclosed anode. The electrochemical cell may further comprise a cathode. The electrochemical cell may further comprise an electrolyte. The electrolyte may be, at least in part, between the anode and the cathode. The electrolyte may be an organic electrolyte. The electrolyte may be an inorganic electrolyte. The electrolyte may be any mixture or combination of organic and/or inorganic electrolytes. The electrolyte may be in any state of matter. The electrolyte may be an $NH_3$, $SO_2$, ether, carbonate, or nitrile solvent based electrolyte, or any mixtures or combination thereof. The electrolyte may comprise an alkali metal and/or alkali earth metal containing electrolyte salt. The electrolyte may comprise a transition metal and/or post transition metal containing electrolyte salt. The matrix material may comprise one or more of the metals of the electrolyte salt. The distributed material may comprise one or more of the metals of the electrolyte salt. A metal of the electrolyte salt may be Na. A metal of the electrolyte salt may be Al. The electrolyte may comprises an alkali metal and/or alkali earth metal containing and/or a transition metal and/or post transition metal containing salt. One or more of the metals of the anode material may be electrochemically active. One or more of the metals of the electrolyte salt may be the matrix material and/or the distributed material. The matrix material and/or the distributed material may be electrochemically active. One or more of the metals of the electrolyte salt may be an electrochemically active anode material. Na may be the alkali metal and Al may be the post transition metal of the electrolyte salt and/or the anode material. The metals of the electrolyte salt may be Na and Al. The the electrolyte salt may be $NaAlCl_4$. The electrolyte may be $NaAlCl_4 \cdot xSO_2$, where x may be any positive real number. All or part of the anode may be used as a substrate for electro-deposition of one or more matrix materials during charging. All or part of the anode may be used as a source of matrix material during discharging. The electrolyte may further comprise one or more electrolyte additives. The electrolyte additive may comprise a halogenated electrolyte additive. The halogenated electrolyte additive may comprise trifluoromethanesulfonyl-chloride ($CF_3SO_2Cl$), thionyl-chloride ($SOCl_2$), $SnCl_4$, and/or fluoro-ethylenecarbonate (4-fluoro-1,3-dioxolan-2-one) or any mixture or combination thereof. Other electrolyte additives, including other halogenated electrolyte additives, are possible according to the invention. Halogenated electrolyte additives may be any halogen-containing molecules. Said halogen-containing molecules may be soluble in the electrolyte. Said halogen-containing molecules may chemically react at the anode and/or cathode surface. Said halogen-containing molecules may participate in the formation of an SEI on the anode and/or cathode surface. The cathode may comprise a cation intercalation capable cathode material. The cathode may comprise a conversion reaction capable cathode material. The cathode may comprise a catholyte liquid. The cathode may comprise any mixture or combination any of said cathode materials. Other cathodes are possible according to the invention. A method for manufacturing the disclosed anode material is described. The method comprises the steps of mixing a matrix material and distributed material and heating the mixture to selectively melt the matrix material to produce a matrix material:distributed material composite. The melting point of the matrix material may be less than the melting point of the distributed material. The heating temperature may be between the melting point of the matrix material and the melting point of the distributed material. The matrix material distributed material composite may be an intermediate matrix material:distributed material composite. The intermediate matrix material distributed material composite may be chemically or mechanically processed to improve the properties of the matrix material:distributed material composite. The improved property may be a reduced size of the distributed material and/or an increased homogeneity of the matrix material distributed material composite.

The conversion reaction capable cathode material may comprise a transition metal halogen compound. The transition metal of the transition metal:halogen compound may be Cu and/or the halogen of the transition metal halogen compound is F. The transition metal of the transition metal halogen compound may be $CuF_2$.

The positive real number x of electrolyte $NaAlCl_4 \cdot xSO_2$ is preferably between 0.1 and 32 is more preferably between 0.5 and 16 and more preferably between 0.8 and 8 and more preferably between 1.1 and 4 and more preferably between 1.3 and 2 and more preferably between 1.4 and 1.6. Other electrolytes, electrolyte solvents, electrolyte salts and electrolyte concentrations are possible according to the invention. The electrolyte according to the invention may be any suitable electrolyte compatible with the anode and/or the anode material of the invention.

The separator according to the invention may be any suitable separator. Examples of separator materials include glass, hydrocarbon, polymer or ceramic based separators, including but not limited to glass fiber, paper, cellulose, polypropelene, polyethylene, cellulose acetate, PVDF, PTFE, PES, nylon, mixed cellulose ester (MCE), PETE, polyester, PEEK, PAN.

A method for manufacturing an anode from the disclosed anode material is disclosed. The method may comprise distributing the prepared anode material on a substrate. The anode material may be distributed on the substrate by any means known in the art.

The method may be used in the manufacture of a device.

Use of the disclosed anode material, the disclosed anode or the disclosed electrochemical cell is described. The disclosed anode material, the disclosed anode or the disclosed electrochemical cell may be used in a device. The device may be an electrical device. The electrical device may include, for instance, an electronic device, battery or battery pack, a motor or actuator, an energy storage device, an energy or power delivery device, an electronic vehicle, power tool, or any other device that may make use of the electrical voltage and/or current generated by means of the anode material, anode or electrochemical cell of the invention.

The distributed material may be in the form of particles. Particle, according to the invention, means a minute fragment or quantity of matter or a small localized object distinct from the matrix material to which can be ascribed one or physical or chemical properties such as composition, shape, morphology or size.

Metals, according to the invention, may include alkali metals, alkaline earth metals, lanthanides, actinides, transition metals, post-transition metals and alloys thereof. Metals, according to the invention, include alloys of metals.

According to one embodiment of the invention, the composite may comprise sodium and aluminum (a sodium:aluminum composite). The matrix metal may be sodium. The distributed material may be aluminum. The distributed material may be in the form or particles. The aluminum particles may be distributed in the sodium matrix material. The particles may be in the form of flakes.

The present invention discloses a method for the preparation of anodes according to the invention for batteries. These anodes may be used either as an alkali metal and/or alkali earth metal, e.g. lithium or sodium, source in charged state assembled battery cells or as an alkali metal and/or alkali earth metal, e.g. lithium or sodium, deposition substrate in discharged state assembled battery cells.

DETAILED DESCRIPTION OF THE EMBODIMENTS

Figure 1:
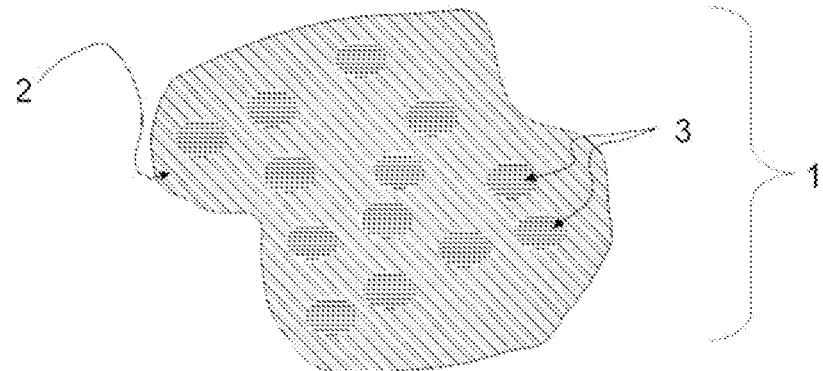
FIG. 1: Anode material according to one embodiment of the invention.

Detailed embodiments of the present invention are disclosed herein with the reference to accompanying drawings.

An electrochemical cell, according to the invention, may comprise an anode according to the invention, a cathode and an electrolyte at least partially between the anode and cathode. An electrochemical cell may further comprise a separator between the anode and cathode. An electrochemical cell may further comprise one or more charge carriers (current collectors). The anode and/or the cathode may also act as current collectors. An electrochemical cell may further comprise a housing. The electrochemical cell of the invention may be a rechargeable electrochemical cell. The electrolyte may be in any state of matter. The electrolyte may be, for instance, a solid, liquid, glass or gel.

The anode of an electrochemical cell, according to the invention, may comprise a composite. The composite may in the form of a matrix material and a distributed material. The matrix material may be continuous (i.e., continuously connected throughout the material). The distributed material may be discontinuous (i.e. dispersed or not continuously connected throughout the material). The matrix material may be a metal or an alloy of two or more metals. The distributed material may a metal or an alloy of metals. The metals may be metallic metals. The metals may be essentially pure metals. The alloys may be alloys of metallic or essentially pure metals. The distributed material may be in the form spheroids, flakes, rods, polyhedrons or any other form or combination of forms (here termed "particle" or "particles"). The distributed material may be distributed or dispersed in the matrix material. The distributed material may be essentially evenly distributed in the matrix material or may be unevenly distributed in the matrix material. The size of the particles may be essentially uniform or have a size distribution. The size of the particles may be preferably between 0.1 and 1000 microns, and preferably between 0.1 and 100 microns and more preferably between 0.1 and 50 microns and most preferably between 0.1 and 10 microns.

Here metallic metals means metals in their elemental or atomic state or otherwise unbound in a molecule with one or more non-metal atoms. Examples of metallic metals include metals that have electrons in 3-dimensional delocalized state. A pure metal here means a material comprising metallic metal or an alloy of metallic metals in a high concentration. Here high concentration means having a mass fraction of metallic metals preferably greater than 90% and more preferably greater than 95% and more preferably greater than 98% and more preferably greater than 99% and more preferably greater than 99.5% and more preferably greater than 99.8% and most preferably greater than 99.9%. Metals, according to the invention, may include alkali metals, alkali earth metals, transition metals and/or post transition metals. Alkali metals include, but are not limited to, Li, Na and K. Other alkali metals are possible according to the invention. Alkali earth metals include, but are not limited to, Be, Mg, Ca and Sr. Other alkali earth metals are possible according to the invention. Transition metals include, but are not limited to, Ti, V, Cr, Mn, Fe, Co, Ni, Cu, Zn, Zr, Nb, Mo, Tc, Ru, Rh, Pd, Ag and Cd. Other transition metals are possible according to the invention. Post transition metals include Al, Ga, In or Sn. Other transition metals are possible according to the invention.

According to one embodiment of the invention, the composite may comprise sodium and aluminum (a sodium: aluminum composite). The matrix metal may be sodium metal. The distributed material may be aluminum metal. The distributed material may be in the form or particles. The aluminum particles may be distributed in the sodium matrix material. The particles may be in the form of flakes. The average size of the aluminum particles, in this embodiment, in the form of flakes, may be between 1 and 100 microns. The average flake size may be below 20 microns. Other particle forms and sizes are possible according to the invention.

The matrix material distributed material composite may be formed by any means known in the art. According to one method according to the invention, a matrix material:distributed material composite is prepared by mixing matrix material and distributed material and heating the mixture above the melting point of the matrix material but below the melting point of the distributed material so as to form a composite of continuous matrix material and dispersed distributed material particles. One or both of the matrix material and the distributed material may be in the form of a powder (i.e. a collection of particles). The composite material may be subsequently further processed, e.g. chemical or physical means, e.g. by mortaring, e.g., in a mortar mill.

Figure 2:
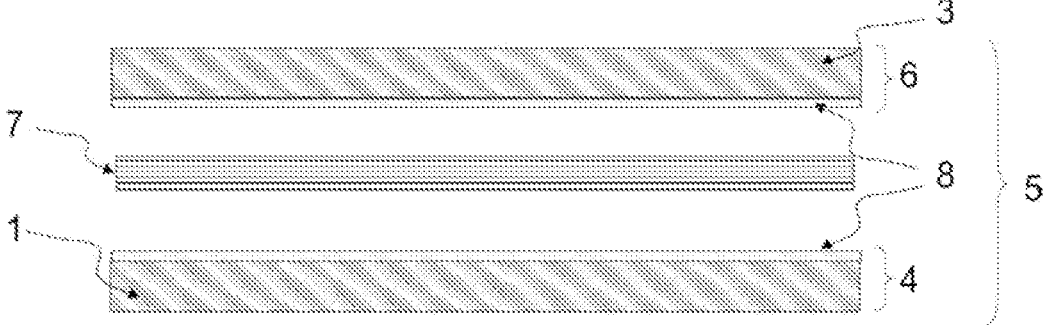
FIG. 2: An electrochemical cell according to the invention, wherein the anode comprises, at least in part, the anode material of the invention.

FIG. 1 describes the anode material (1) according to one embodiment of the invention. The anode material (1) may comprise a matrix material (2) distributed material (3) composite. As shown in cross-section in FIG. 2, the anode material (1) may comprise all or part of the anode (4) of an electrochemical cell stack (5) according to the invention. The electrochemical cell stack (5) may further comprise a cathode (6). The electrochemical cell stack (5) may further comprise a separator or spacer (7) between the anode (1) and the cathode (6). The anode (4) and/or cathode (6) may further comprise one or more solid electrolyte interface (SEI) layers (8) on the anode (4) and/or the cathode (6). The cell stack (5) may further comprise an electrolyte (not shown) at least partially between the anode (4) and the cathode (6).

The cathode (6) may comprise any compatible cathode material, included but not limited to cation intercalation capable cathode materials, conversion reaction capable cathode material and/or catholyte liquids. Other cathode materials are possible according to the invention. Here a cation intercalation capable cathode material means a material in which the concentration of infused and departing cations and electrons is varied without a change in the host material's molecular crystal structure, Here a conversion reaction capable cathode material means a material in which the concentration of infused and departing cations and electrons is varied along with a change in the host material's molecular crystal structure, Here a catholyte liquid mean a reversible conversion reaction capable cathode material in the liquid state.

A suitable cathode according to the invention may comprise a transition metal:halogen compound. The transition metal:halogen compound may be an active material in the cathode. The transition metal:halogen compound may be the active material in the cathode. The transition metal of the transition metal:halogen compound may be, for instance, Sc, Ti, V, Cr, Mn, Fe, Co, Ni, Cu, Zn, Y, Zr, Nb, Mo, Tc, Ru, Rh, Pd, Ag, Cd, Hf, Ta, W, Re, O, Ir, Pt, Au, Hg, Rf, Db, Sg, Bh, Hs, Mt, Ds, Rg and/or Cn and/or any combination thereof. The halogen of the transition metal:halogen compound may be, for instance, F, Cl, Br, and/or I and/or any combination thereof. The transition metal may comprise Cu and the halogen may comprise F. The transition metal:halogen compound may comprise Cu and F as a transition metal and a halogen respectively. The Cu and F containing transition metal:halogen compound may comprise $CuF_2$ active material. The cathode and/or cathode material may further comprise a conductive additive. The conductive additive may comprise a conductive material. The conductive material may be a metal or a metallic material. The metallic and/or conductive material may comprise carbon. The carbon comprising additive may be a carbon additive. The metallic conductive additive may be a nanomaterial. The conductive additive may be in in the form of a tube, wire, ball or flake. The conductive additive may comprises carbon or an allotrope thereof and/or a metal. The conductive additive may be in the form of a conductive high aspect ratio particle. The metallic and/or carbon comprising conductive additive may be a nanotube (e.g. a carbon nanotube), nanowire (e.g. a metal nanowire), nanoball (e.g. a fullerene) a nanoflake (e.g. a graphene or graphite) or a hybrid or combination thereof (e.g. a carbon nanobud), ketjen black, hard carbon, nanofibers, activated carbon, reduced graphene oxide and any combination thereof.

The (transition metal:halogen compound) (conductive additive) mass ratio in the cathode and/or cathode material, e.g. $CuF_2$ conductive carbon additive, may be between 20:1 and 1:10 and more preferably between 15:1 and 1:4, and more preferably between 10:1 and 1:2 and more preferably between 7:1 and 1:1 and more preferably between 5:1 and 3:1 or any combination thereof and most preferably be approximately 4:1.

Other cathodes, cathode materials, active materials, conductive additives, carbons and mass ratios are possible according to the invention.

Figure 3:
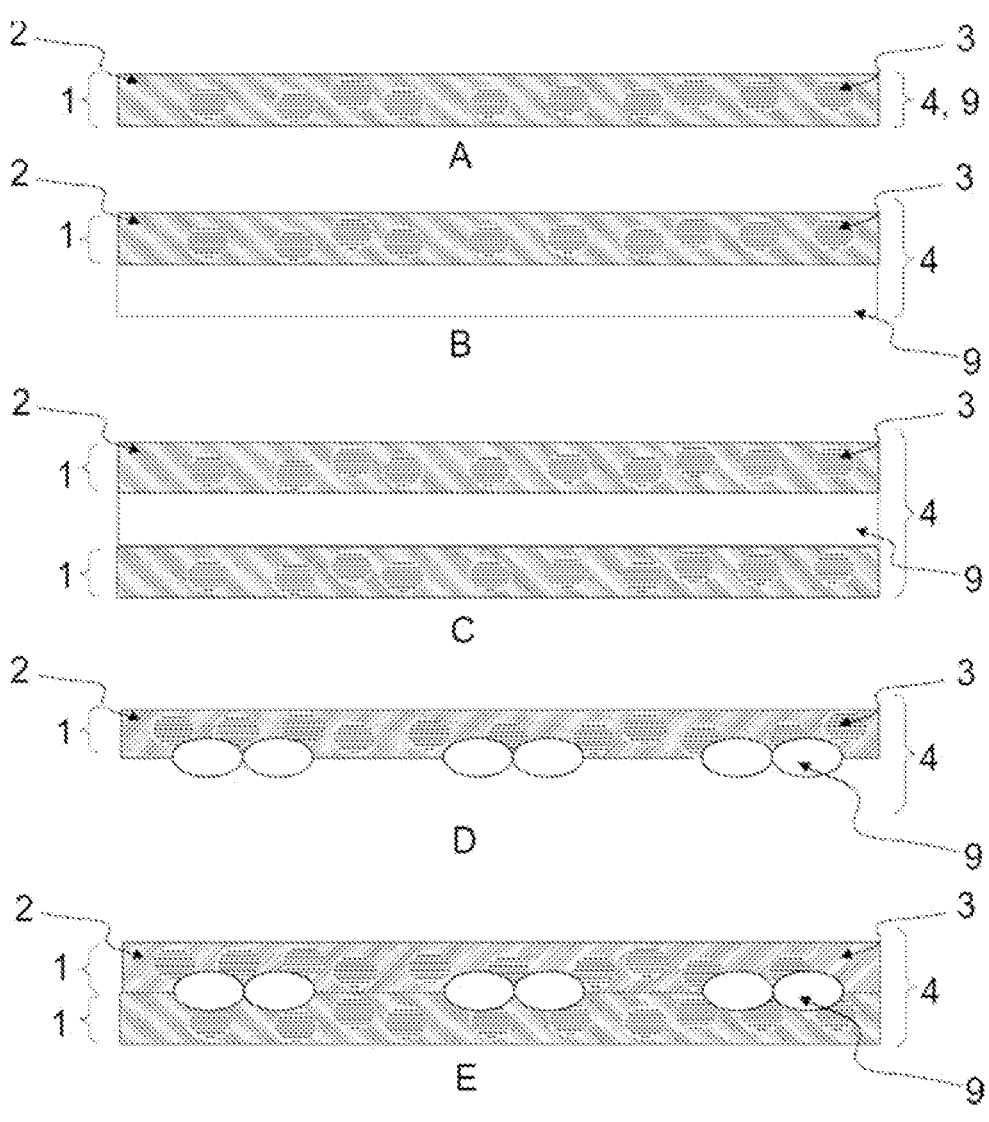
FIG. 3: Exemplary anodes according to several embodiments of the invention.

FIG. 3 describes in cross-section various exemplary embodiments of the anode (4) according to the invention. As shown in embodiment 3A, the anode (4) may be made solely of the anode material (1), comprising the matrix material (2) and the distributed material (3). In this case, the anode material may also act as an anodic current collector (9). As shown in embodiments 3B-3E, the anode material (1) may be deposited on and/or or in a separate anodic current collector (9). The current collector (9) may comprise any appropriate conductive material compatible with, for instance, the anode material (1) and/or the electrolyte (not shown) under the charging and/or discharging and or storage voltage and/or current of the electrochemical cell (5). The current collector (9) may be in the form of, for instance a foil or film of current collector material, as shown in FIGS. 3B and 3C. The anode material (1) may be on one side of the current collector (9), as shown in FIG. 3B, or may be on both sides of the current collector (9), as shown in FIG. 3C. The anodic current collector (9) may be in the form of, for instance, an open structure such as, for instance, a mesh, perforated foil, weave or other topology containing voids or open spaces, of anodic current collector material, as shown in FIGS. 3D and 3E. The anode material (1), in such a case, may be placed so as to fully or partially fill the void spaces of the open structure of the anodic current collector (9). The anode material (1) may be on one side of the current collector (9), as shown in FIG. 3D, or may be on both sides of the current collector (9), as shown in FIG. 3E.

The herein disclosed anode material may be used either as current collector substrate for metallic metal electro-deposition in discharged state assembled electrochemical cells, or as charged state metallic metal electrode in charged state assembled electrochemical cells.

The material of the separate anodic current collector (9) may be any suitable electrically conductive material. Here electrically conductive material means material having electric conductivity greater than approximately $1 \times 10^5$ $\sigma$(S/m) at 20° C. Examples of electrically conductive materials include metallic materials. Metallic materials include materials that have electrons in 3-dimensional delocalized state. Examples of metallic materials may include metals. Examples of metals may include Hg, Dy, Eu, Ce, Er, Ho, La, Pr, Tm, Nd, Y, Sc, Lu, Po, Am, Ti, Zr, Sb, Fr, Ba, Hf, As, Yb, U, Pb, Cs, V, Pa, Re, Tl, Th, Tc, Ga, Nb, Ta, Sr, Cr, Rb, Sn, Pd, Pt, Fe, Li, Os, In, Ru, Cd, K, Ni, Zn, Co, Mo, W, Ir, Na, Rh, Mg, Ca, Be, Al, Au, Cu, Ag and any mixtures, alloys or combinations thereof. Metallic materials may include allotropes of carbon. Allotropes of carbon include diamond, graphite, graphene, amorphous carbon, fullerenes, carbon nanotubes, carbon nanobuds and glassy carbon, carbon nanofoam, lonsdaleite, linear acetylenic carbon or any other allotrope of carbon and/or any combination thereof. Other metallic materials are possible according to the invention. The choice of suitable current collector material is dependent on the specifics of, for instance, the battery composition, chemical and electrochemical stability with regards to the electrolyte, charging voltage and/or charge and/or discharge current.

The matrix material:distributed material composite anode material may be prepared by any means known in the art. One method of preparation is to heat a mixture of matrix material and distributed material particles above the melting point of matrix material but below the melting point of distributed material to create a matrix material distributed material composite matirial. The composite material can then subsequently processed to improve the material properties, such as particle size or composite homogenaity. This can be by any means known in the art, for instance, by being mortared, for instance, in a mortar mill. Any heating and/or processing time is possible according to the invention. Preferably, the processing time is between 1 and 1000 minutes, and more preferably, between 2 and 100 minutes and most preferably between 5 and 50 minutes. The heating and/or mortaring processes can be carried out under any appropriate atmosphere. Preferably the atmosphere is inert to one or both of the matrix material and distributed material. Examples include, but are not limited to argon and nitrogen atmospheres. The matrix material distributed material mass ratio of the mixture may be any defined ration. Preferably the ratio is between 100:1 and 1:100, and more preferably between 50:1 and 1:50 and more preferably between 20:1 and 1:20 and more preferably between 10:1 and 1:10 and more preferably between 5:1 and 1:5, and more preferably between 3:1 and 1:3, and more preferably between 2:1 and 1:2, and most preferably between 1.1:1 and 1:1.1.

Figure 4:
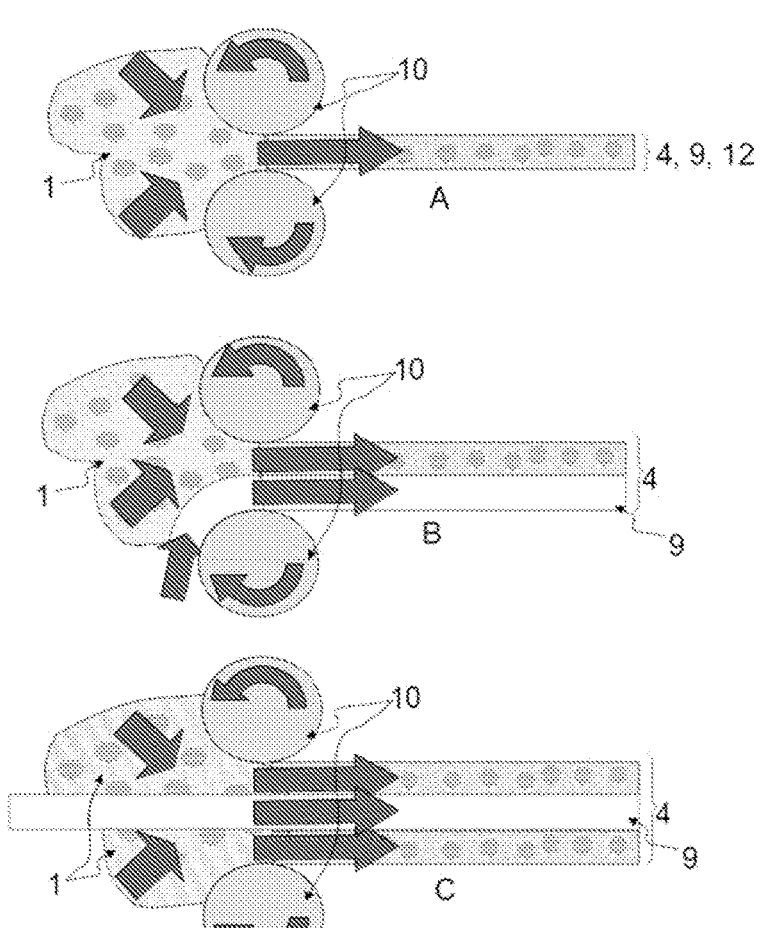
FIG. 4: Exemplary means of producing anodes and freestanding anode material films according to several embodiments of the invention.
Figure 5:
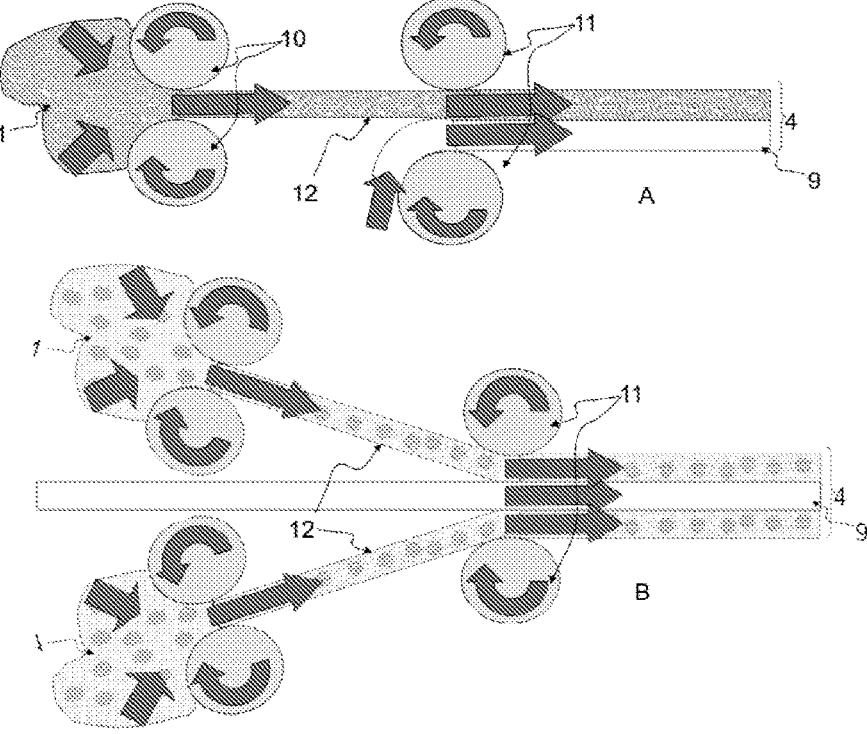
FIG. 5: Exemplary means of producing anodes from freestanding anode material films according to several embodiments of the invention.

The anode material (1) may be processed by any means known in the art to create the anode (4). Examples include rolling, e.g. through a nip, dip coating, calandering, hydraulic pressing. An exemplary means of forming the anode (1) according to the invention are shown in FIG. 4. As shown in FIG. 4A, anode material (1) may be drawn through a nip (10) to form, either a an anode (4), wherein the anode (4) is also the current collector (9) or a freestanding anode material film (12). As shown in FIG. 4B, anode material (1) may be drawn through a nip (10) to form, together with a current collector (9), an anode (4) comprising separate anode material (1) and current collector substrate (9). As shown in FIG. 4C, anode material (1) may be drawn through a nip (10) to form, together with a current collector (9), an anode (4) comprising separate anode material (1) in two layers on both sides of a current collector substrate (9). FIG. 5 shows how a freestanding anode material film (12), produce by the method of FIG. 4 or otherwise, can be combined with a current collector (9) substrate to form a one-sided (FIG. 5A) or two-sided (FIG. 5B) anode (4) by passing one or two freestanding anode material films (12) through a lamination nip (11).

It has been surprisingly discovered that employing halogenated electrolyte additives may further improve the electrochemical performance of the herein disclosed matrix mateiral distributed material composite anode. Here, halogenated electrolyte additives are defined as halogen-containing molecules, which are soluble in the electrolyte and chemically react at the anode or cathode surface. Any halogenated electrolyte additive can be used according to the invention. Halogenated here means having a halogen in the molecule. Halogens include, but are not limited to Fl, Cl, Br and I.

EXAMPLES

In one embodiment of the method, sodium aluminum composite anode material has been prepared by first mixing sodium metal and a powder of aluminum flakes and heating the mixture of sodium and aluminum flakes above the melting point of sodium (98° C.) but below the melting point of aluminum (660° C.). In this example the temperature was approximately 120° C. The sodium:aluminum mass ratio of the mixture according to this embodiment was approximately 1:1. For this embodiment of the invention, the ratio is preferably between 5:1 and 1:5, and more preferably between 3:1 and 1:3, and more preferably between 2:1 and 1:2, and most preferably between 1.1:1 and 1:1.1. The resulting Na:Al intermediate composite material was then subsequently further processed by being mortared in a mortar mill for 10 minutes during its cooling to create the final composite material. This heating and mortaring process was carried out under an argon atmosphere, which is inert to metallic sodium.

Figure 6:
FIG. 6: A photograph of the exemplary preferred anode material, with 1:1 mass ratio of Na:Al
Figure 7:
FIG. 7: A photograph of the electrode produced from the exemplary preferred anode material, with 1:1 mass ratio of Na:Al

It has been surprisingly discovered that, as the sodium cools below its melting point, mortaring action produces a homogeneous composite from the sodium:aluminum mixture, with a flaky appearance. The visual appearance of the resulting material is shown in FIG. 6. This homogeneous composite formation is surprising, since sodium is known to poorly wet other materials, i.e. sodium has a generally poor affinity for dispersion. As the resulting sodium:aluminum composite was transferred out into ambient air, it has been surprisingly discovered that its air stability is significantly higher than the stability of plain sodium metal, and the composite retained its shiny metallic appearance. In a dry-room environment, the sodium aluminum composite was found to be sufficiently stable to allow the production of battery electrodes. The sodium:aluminum composite was found to be sufficiently soft for being press-rolled into a continuous film and/or for lamination onto a current collector film or into a current collector mesh. Upon warming the composite to higher temperature than room temperature, but still below the sodium melting point, its softness was found to increase further. This mechanical property allows simple and cost effective electrode production from the herein disclosed sodium aluminum composite material. FIG. 7 shows an anodic electrode, produced by pressing the sodium:aluminum composite into an aluminum mesh current collector.

The herein disclosed anode material may be used either as current collector substrate for metallic sodium electro-deposition in discharged state assembled battery cells, or as charged state sodium electrode in charged state assembled battery cells.

Figure 8:
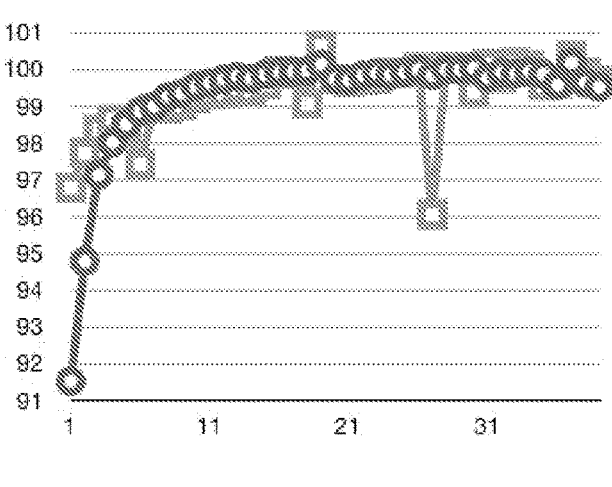
FIG. 8: The comparative Coulombic efficiency evolution of a battery cell containing $CuCl_2 \leftrightarrow CuCl+NaCl$ conversion cathode, $NaAlCl_4.2SO_2$ electrolyte, and two versions of the anode:pure metallic sodium versus Na:Al composite material, with 1:1 mass ratio of Na:Al. The horizontal scale shows the cycle number, and the vertical scale shows the efficiency %. Charts A and B show full efficiency scale and the scale near to 100%, respectively.
Figure 8:
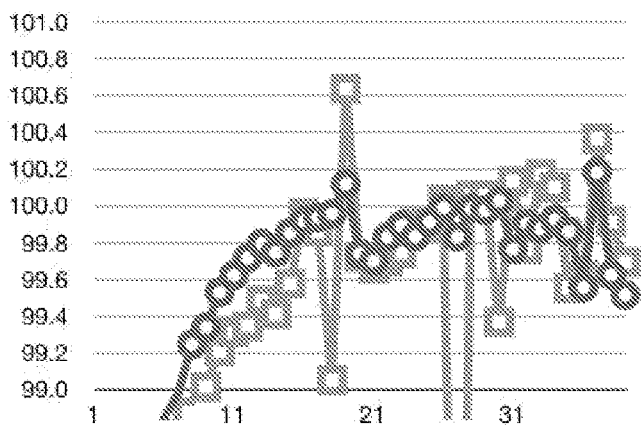
Figure 9:
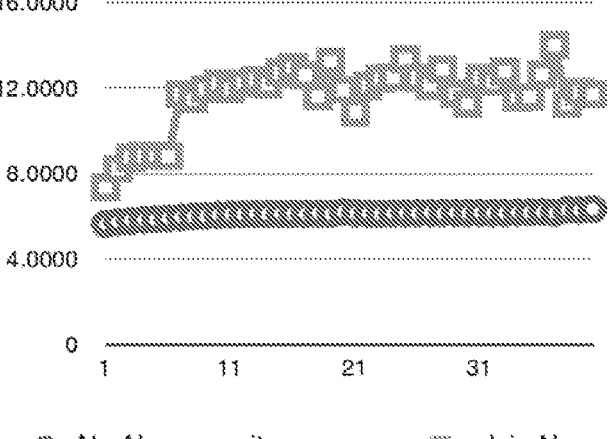
FIG. 9: The comparative discharge time/discharge capacity evolution of a battery cell containing $CuCl_2 \leftrightarrow CuCl+NaCl$ conversion cathode, $NaAlCl_4.2SO_2$ electrolyte, and two versions of the anode:pure metallic sodium versus Na:Al composite material, with 1:1 mass ratio of Na:Al. The horizontal scale shows the cycle number, and the vertical scale has s/μAh units.
Figure 10:
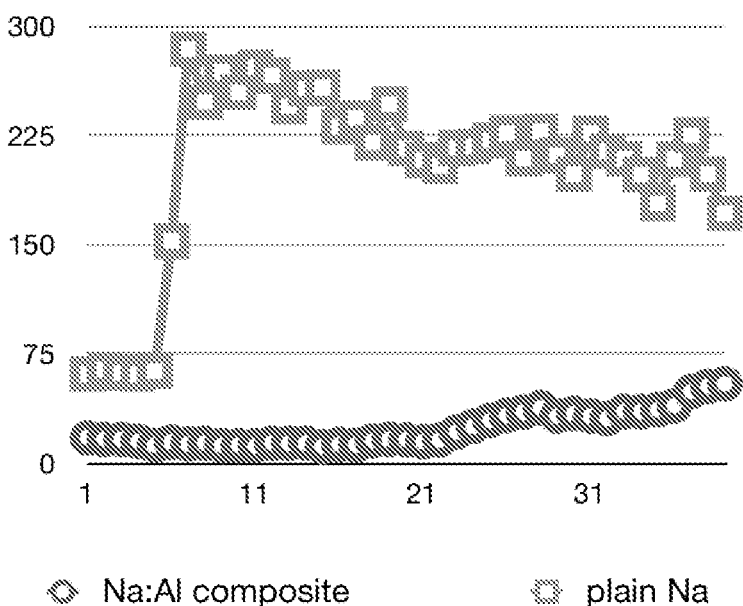
FIG. 10: The comparative Internal Resistance evolution of a battery cell containing $CuCl_2 \leftrightarrow CuCl+NaCl$ conversion cathode, $NaAlCl_4.2SO_2$ electrolyte, and two versions of the anode:pure metallic sodium versus Na:Al composite material, with 1:1 mass ratio of Na:Al. The horizontal scale shows the cycle number, and the vertical scale has Ω units.
Figure 11:
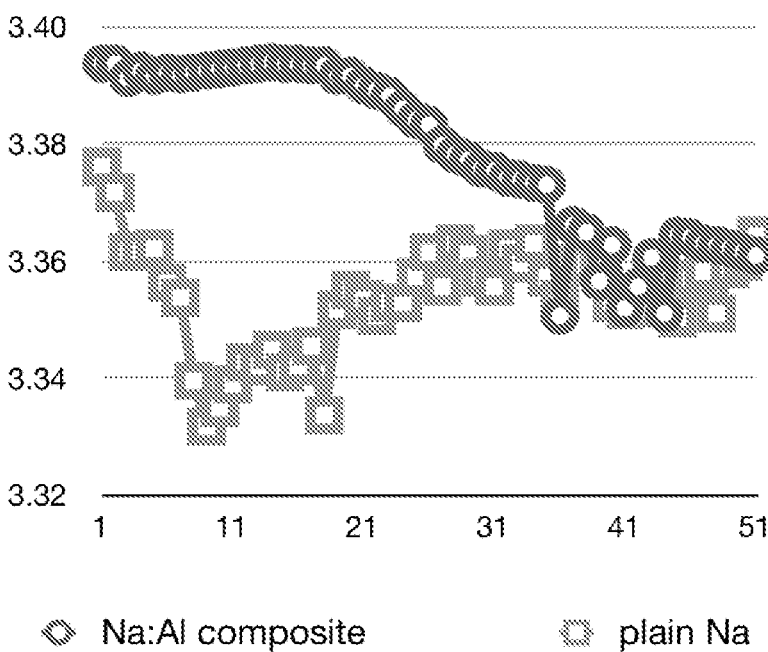
FIG. 11: The comparative average discharge voltage evolution of a battery cell containing $CuCl_2 \leftrightarrow CuCl+NaCl$ conversion cathode, $NaAlCl_4.2SO_2$ electrolyte, and two versions of the anode:pure metallic sodium versus Na:Al composite material, with 1:1 mass ratio of Na:Al. The horizontal scale shows the cycle number, and the vertical scale has V units.

The electrochemical properties of the resulting anode were evaluated in battery cells comprising $NaAlCl_4.2SO_2$ electrolyte formulation. This electrolyte was selected for evaluation because it supports the reversible cycling of a metallic sodium anode, and therefore, allows electrochemical comparison against a plain metallic sodium anode. The employed cathode was a discharged state cathode comprising a Cu+2NaCl active material formulation. After charging the cathode to $CuCl_2$ state, the cathode was cycled according to the $CuCl_2 \leftrightarrow CuCl+NaCl$ conversion reaction. The electrochemical performance of 1:1 mass ratio Na:Al composite anode versus plain metallic Na anode was evaluated by measuring three parameters during battery cycling: i) Coulombic Efficiency; ii) discharge time/discharge capacity ratio; and iii) Internal Resistance of the cell. FIGS. 8-10 show the measured data. As seen from FIG. 8, the average Coulombic Efficiency is similar in both cases. However, the fluctuation of Coulombic Efficiency is smaller for the Na:Al composite anode, indicating a more stable electrode-electrolyte interface. The discharge program is composed of a sequence of decreasing discharge currents, each step ending at the cut-off voltage of 3.2 V. The duration of discharge under such discharge program is related to the resistance of the electrode-electrolyte interface, since longer discharge time means the shifting of the discharge towards lower currents. The discharge time is divided by the discharge capacity of the cathode, in order to eliminate cathode capacity evolution effects. As seen from FIG. 9, the discharge time is significantly shorter for the Na:Al composite anode, indicating a significantly lower resistance of the electrode-electrolyte interface. The Internal Resistance of the cell is estimated from the voltage data evolution at the charging start and stop events. As seen from FIG. 10, the Internal Resistance is significantly smaller for the Na:Al composite anode, again indicating a significantly lower resistance of the electrode-electrolyte interface. As seen from FIG. 11, the average discharge voltage is approximately the same for the Na:Al composite anode as for the metallic Na anode. Therefore the herein described performance improvements have no disadvantage in terms of cell voltage. Altogether, these data prove the improved cell performance of the herein disclosed Na:Al composite anode campared to cell comprising a pure metallic Na anode.

As an anode for charged state assembled cells, the preferred embodiment of 1:1 mass ratio between Na:Al composite is a dense anode with 550 mAh/g gravimetric capacity, which can be operated at the potential of −2.7 V vs. SHE. As an anodic substrate for discharged state assembled cells, the preferred embodiment of 1:1 mass ratio between Na:Al composite anode supports highly efficient and durable anodic cycling of metallic sodium deposition and stripping. In both cases, the electrochemical performance is better than the performance of pure metallic Na anodes. Battery cells employing the herein disclosed anode may be assembled in a dry room environment.

Figure 12:
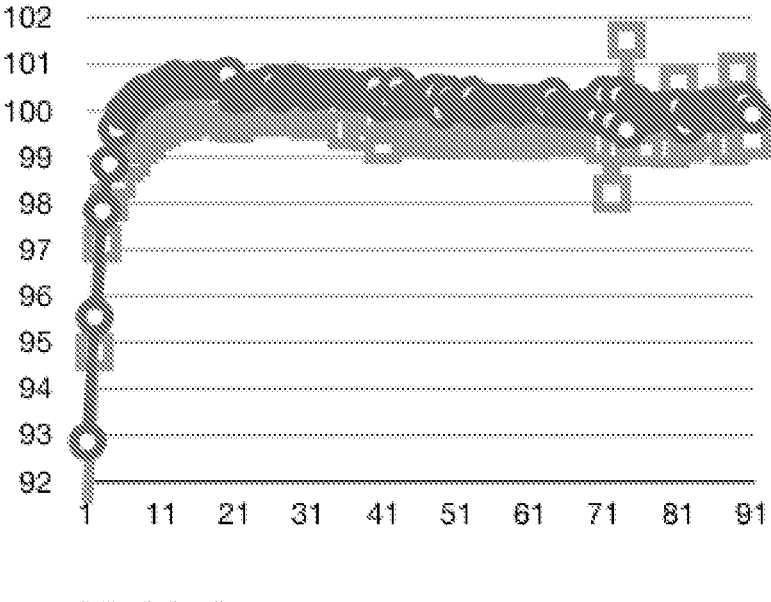
FIG. 12: The comparative Coulombic efficiency evolution of a battery cell containing $CuCl_2 \leftrightarrow CuCl+NaCl$ conversion cathode, Na:Al composite anode with 1:1 mass ratio of Na:Al, and two versions of the $NaAlCl_4.2SO_2$ electrolyte: without additives versus 2 weight % $CF_3SO_2Cl$ additive containing. The horizontal scale shows the cycle number, and the vertical scale shows the efficiency %. Charts A and B show full efficiency scale and the scale near to 100%, respectively.
Figure 12:
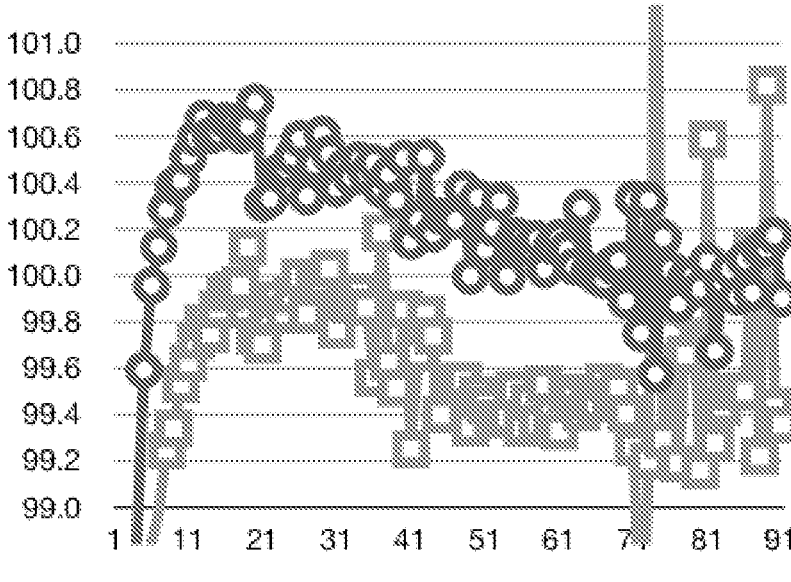
Figure 13:
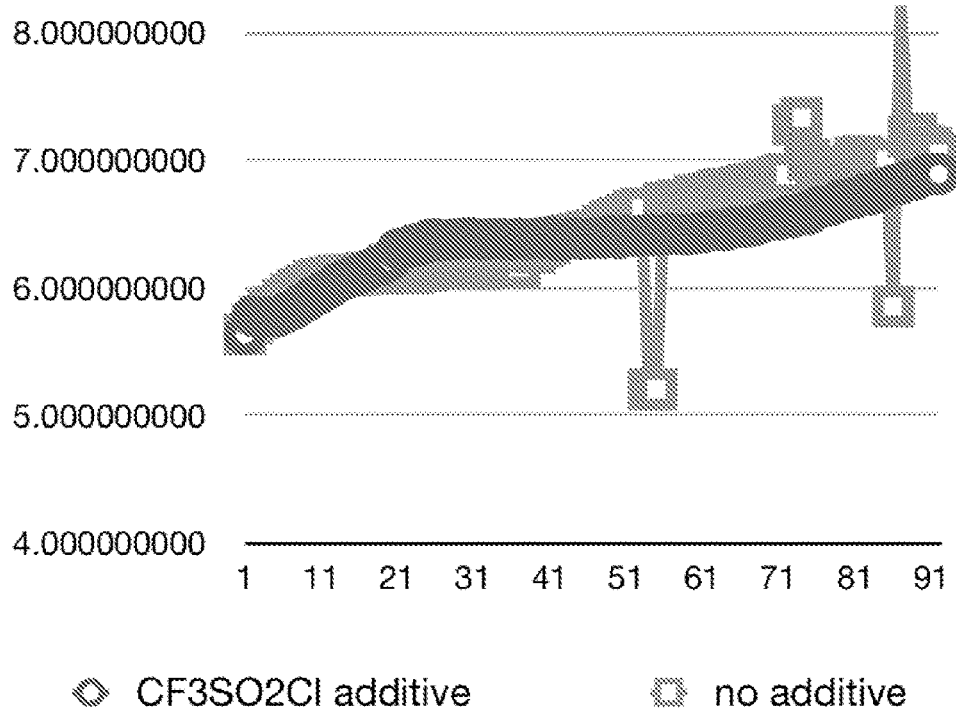
FIG. 13: The comparative discharge time/discharge capacity evolution of a battery cell containing $CuCl_2 \leftrightarrow CuCl+NaCl$ conversion cathode, Na:Al composite anode with 1:1 mass ratio of Na:Al, and two versions of the $NaAlCl_4.2SO_2$ electrolyte: without additives versus 2 weight % $CF_3SO_2Cl$ additive containing. The horizontal scale shows the cycle number, and the vertical scale has s/μAh units.
Figure 14:
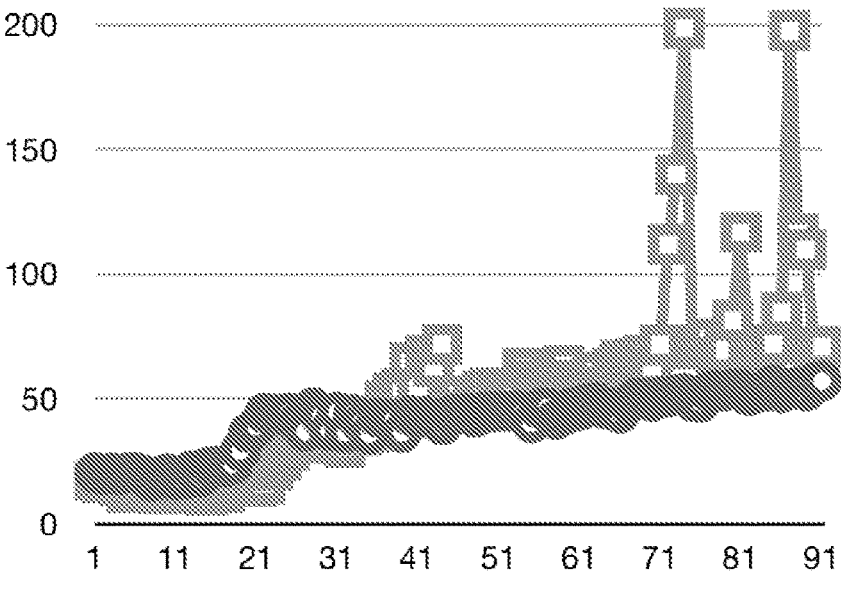
FIG. 14: The comparative Internal Resistance evolution of a battery cell containing $CuCl_2 \leftrightarrow CuCl+NaCl$ conversion cathode, Na:Al composite anode with 1:1 mass ratio of Na:Al, and two versions of the $NaAlCl_4.2SO_2$ electrolyte: without additives versus 2 weight % $CF_3SO_2Cl$ additive containing. The horizontal scale shows the cycle number, and the vertical scale has Ω units.

It has been surprisingly discovered that employing halogenated electrolyte additives may further improve the electrochemical performance of the herein disclosed Na:Al composite anode. The anodic performance of the Na:Al composite is compared in two versions of the $NaAlCl_4.2SO_2$ electrolyte: additive-free versus 2 weight % $CF_3SO_2Cl$ additive containing. The anodic performance was evaluated by measuring three parameters during battery cycling: i) Coulombic Efficiency; ii) discharge time/discharge capacity ratio; and iii) Internal Resistance of the cell. FIGS. 12-14 show the measured data. As seen from FIG. 12, the Coulombic Efficiency is initially higher than 100% for the cell with $CF_3SO_2Cl$ additive containing electrolyte, indicating the consumption of the electrolyte additive. However, after about 50 cycles, the Coulombic Efficiency of the cell with $CF_3SO_2Cl$ additive containing electrolyte converges very close to 100%, demonstrating better Coulombic Efficiency than the additive-free electrolyte. As seen from FIGS. 13-14, the discharge time is slightly shorter and the Internal Resistance is slightly lower for the cell with $CF_3SO_2Cl$ additive containing electrolyte, indicating a slightly lower resistance of the electrode-electrolyte interface. It is also seen from FIGS. 13-14 that resistance fluctuation is smaller with the $CF_3SO_2Cl$ additive containing electrolyte, indicating a more stable electrode-electrolyte interface. Altogether, these data show that the anodic performance of the herein disclosed Na:Al composite anode may be further enhanced by employing one or more halogenated electrolyte additives. The long-term cycling stability is also demonstrated by this data.

Figure 15:
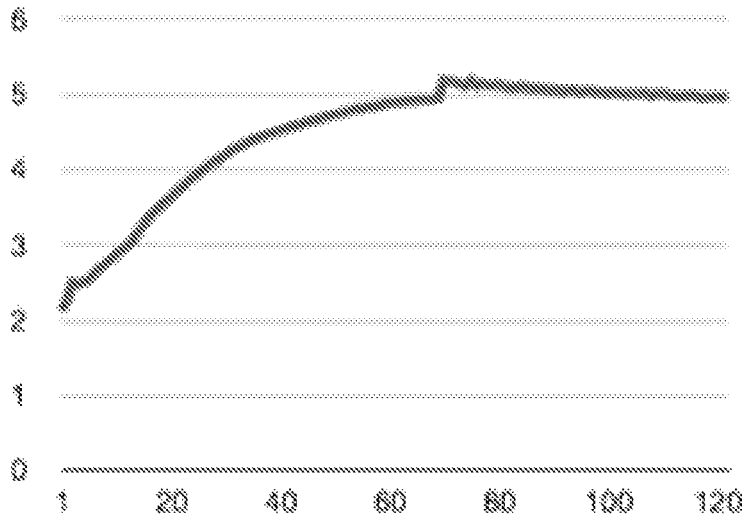
FIG. 15: The discharge capacity versus cycle number of a rechargeable battery, built with Na:Al composite anode having 1:1 mass ratio of Na:Al, $CuF_2$ cathode, and $NaAlCl_4.1.5SO_2$ electrolyte. The horizontal scale shows the cycle number, and the vertical scale has mAh units.

An exemplary rechargeable cell was produced according to one embodiment of the invention, employing the following cell structure. The anodic electrode comprised Na:Al composite with 1:1 mass ratio between Na and Al metals. The cathodic electrode comprised $CuF_2$ active material with 4:1 mass ratio between $CuF_2$ and the conductive carbon additive, though other cathodes, cathode materials, active materials, conductive additives, carbons and mass ratios are possible according to the invention. The electrodes had 2.5 cm² surface area. The electrolyte had $NaAlCl_4.1.5SO_2$ composition, and we used glass fiber separator, though other electrolytes, electrolyte compositions and separator materials are possible according to the invention. FIG. 15 shows the cell's discharge capacity versus cycle number for said example. Cycles 1-70 show increasing discharge capacity, due to the gradual activation of the larger $CuF_2$ particles in the cathode. The cell was rested for 5 days at cycle 70. Starting from approximately cycle 70, the cell demonstrated stable discharge capacity. The average cell voltage was 3.35 V during the discharge. This cell demonstrates the stable operation of the herein disclosed anode structure in a rechargeable cell.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A rechargeable electrochemical cell comprising a cathode, an anode, and an electrolyte, at least in part, between the anode and the cathode, wherein the anode material comprises a matrix material:distributed material composite, and wherein the matrix material comprises metallic sodium metal and the distributed material comprises a metal and the distributed material metal that is different from the matrix material, wherein the electrolyte comprises an NH3, SO2, ether, carbonate, or nitrile solvent based electrolyte, or any mixture or combination thereof.

2. The rechargeable electrochemical cell of claim 1, wherein the distributed material comprises one or more transition metals and/or post transition metals, wherein the one or more post transition metals comprise aluminum, gallium, indium, tin and/or lead.

3. The rechargeable electrochemical cell of claim 1, wherein the distributed material comprises aluminum.

4. The rechargeable electrochemical cell of claim 1, wherein the anode further comprises a current collector and/or an SEI layer.

5. The rechargeable electrochemical cell of claim 1, wherein the electrolyte comprises an electrolyte salt, and wherein the matrix material and/or the distributed material comprise(s) one or more of the metals of the electrolyte salt.

6. The rechargeable electrochemical cell of claim 1, wherein the electrolyte comprises an electrolyte salt, and wherein metals of the electrolyte salt are Na and Al.

7. The rechargeable electrochemical cell of claim 1, wherein the electrolyte comprises an electrolyte salt, and wherein the electrolyte salt is $NaAlCl_4$.

8. The rechargeable electrochemical cell of claim 7, wherein the electrolyte is $NaAlCl_4 \cdot xSO_2$.

9. The rechargeable electrochemical cell of claim 1, wherein all or part of the anode is used as a substrate for electro-deposition of one or more matrix materials during charging and/or, wherein all or part of the anode is used as a source of matrix material during discharging.

10. The rechargeable electrochemical cell of claim 1, wherein the electrolyte further comprises one or more electrolyte additives.

11. The rechargeable electrochemical cell of claim 10, wherein the electrolyte additive comprises a halogenated electrolyte additive.

12. The rechargeable electrochemical cell of claim 11, wherein the halogenated electrolyte additive comprises trifluoromethanesulfonyl-chloride ($CF_3SO_2Cl$), thionyl-chloride ($SOCl_2$), $SnCl_4$, and/or fluoro-ethylenecarbonate (4-fluoro-1,3-dioxolan-2-one) or any mixture or combination thereof.

13. The rechargeable electrochemical cell of claim 12, wherein the cathode comprises a cation intercalation capable cathode material, a conversion reaction capable cathode material, a catholyte liquid or any mixture or combination thereof.

14. The rechargeable electrochemical cell of claim 13, wherein the conversion reaction capable cathode material comprises a transition metal:halogen compound.

15. The rechargeable electrochemical cell of claim 14, wherein the transition metal of the transition metal:halogen compound is Cu and/or the halogen of the transition metal:halogen compound is F and/or wherein the transition metal of the transition metal:halogen compound is $CuF_2$.

16. A method of manufacturing the anode material of claim 1 comprising the steps of mixing a matrix material and distributed material and heating the mixture to selectively melt the matrix material to produce a matrix material:distributed material composite.

17. The method of claim 16, wherein the matrix material:distributed material composite is an intermediate matrix material:distributed material composite and, wherein the intermediate matrix material:distributed material composite is chemically or mechanically processed to reduce the size of the distributed material and/or to increase the homogeneity of the matrix material:distributed material composite.

* * * * *